Nov. 5, 1963 W. L. RAICH 3,109,526
SYSTEM FOR SENSING PASSAGE OF MAGNETIC OBJECTS
Filed Oct. 10, 1960
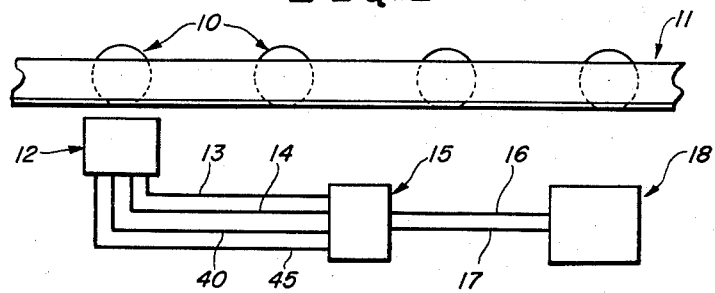
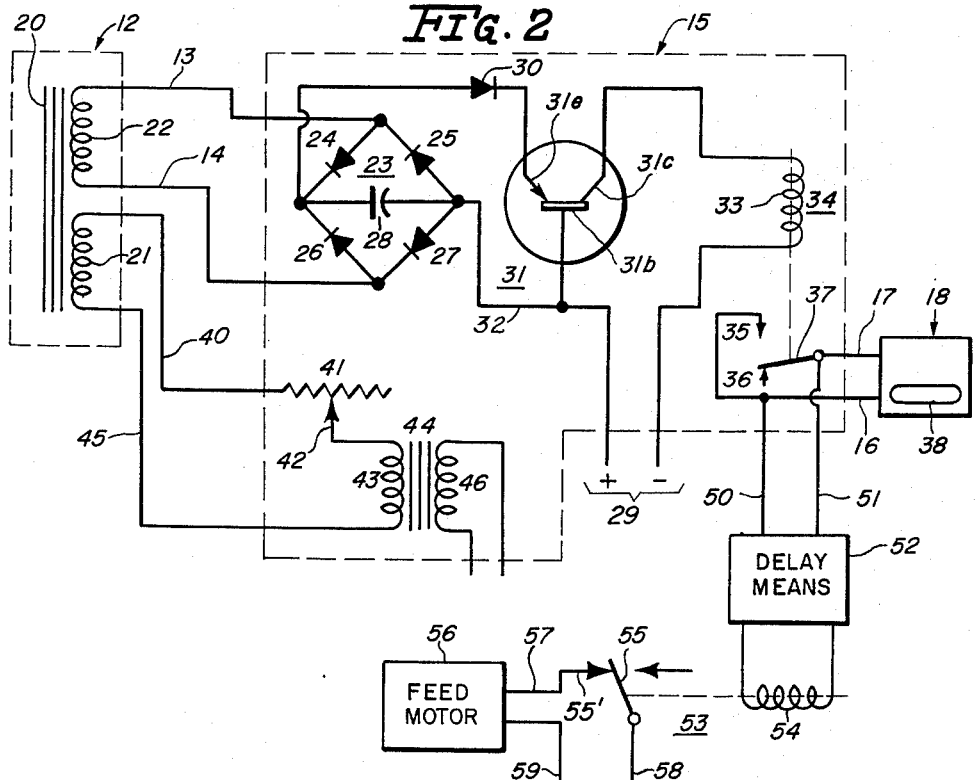
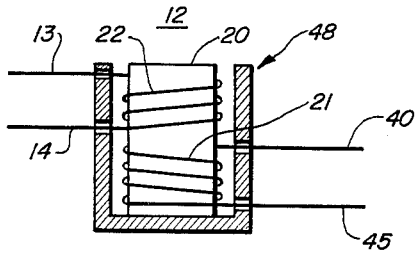
INVENTOR.
Walter L. Raich
BY
Attys.

United States Patent Office 3,109,526
Patented Nov. 5, 1963

3,109,526
SYSTEM FOR SENSING PASSAGE OF MAGNETIC OBJECTS
Walter L. Raich, Chicago, Ill., assignor to Great Lakes Runway Company, Chicago, Ill., a corporation of Illinois
Filed Oct. 10, 1960, Ser. No. 61,502
3 Claims. (Cl. 192—125)

This invention is directed to means for sensing or detecting the passage of an object including at least some magnetic material past a preassigned counting point, and more particularly to such a system in which a magnetic circuit is, in effect, altered by the passage of such an object. The change or alteration in the magnetic circuit is detected to give an indication of the number of such objects passing the preassigned point, and also to indicate that the system is functioning properly.

In the manufacturing of many types of goods, it is requisite that the counting or tallying operation at the end of a production line be accomplished independently of human operators. Many products, such as cans, are of uniform shape; with such objects it is possible to use a runway channel to direct or route the finished cans along a preassigned path toward the packing point. Because the cans pass the counting point with great rapidity it is not practical to utilize a completely mechanical system to tally the number of units passing over the output runway. Although attempts have been made to produce sensing or counting units based upon electrical rather than mechanical principles, such units have generally not found acceptance because of their complexity, expense, and bulk. It is accordingly a primary object of the present invention to provide a system which is simpler and more compact than prior art systems for detecting the passage of magnetic objects past a preassigned counting point.

It is another object of the invention to provide a counting system which can readily be incorporated in existing material-handling systems.

It is a further object of the invention to provide such a counting system which is simple and economical in operation.

A counting system formed in accordance with the inventive teaching includes a magnetic sensing unit or transformer having a core, and input and output windings positioned on the core. The input winding of the sensing unit is energized at a level sufficient to provide an output signal of reference level in the output winding for the given magnetic circuit; the sensing unit is positioned at a preassigned counting point adjacent a can runway or other material-handling path over which magnetic objects pass. The magnetic circuit is altered as the material of the can is, in effect, added to the core material as the can passes the preassigned counting point. Responsive to this alteration of the magnetic circuit, the level of the signal in the output winding is raised significantly above the reference level. Means are provided for amplifying the high level output signal produced by passage of the magnetic object. Counting means are coupled to the amplifier means to tally or register the number of signal level increases, thus giving an indication of the total number of magnetic objects passing the counting point. Delay means are also coupled to the amplifier to recognize a jam in the can runway as indicated by a failure of the amplified output signal to return to the reference level. The delay means is connected to interrupt the energizing circuit for the feed motor which passes cans into the can runway when a jam occurs.

The features of the present invention which are believed to be novel are set forth with particularity in the appended claims. The invention, itself, together with further objects and advantages thereof, may best be understood by reference to the following description taken in connection with the accompanying drawings, in the several figures of which like reference numerals identify like elements, and in which:

FIGURE 1 is a side view of a preferred embodiment of the inventive system positioned adjacent a portion of a material-handling system;

FIGURE 2 is a schematic diagram showing the circuit elements of the inventive system; and FIGURE 3 is a side view, partly in section, of a component shown in FIGURES 1 and 2.

The principles of the invention are applicable to any material-handling system in which a preassigned path is established to provide a counting point for objects comprised of at least some magnetic material. In the illustrated embodiment, these principles will be explained in conjunction with a can runway, a portion of which is shown in FIGURE 1. As there illustrated, a material-handling path for a plurality of cans 10 is established by a runway 11. It is preferable that the runway be made of wood or a non-magnetic material, at least in the section adjacent the sensing unit, to avoid interference with the counting process. Alternatively, an aperture can be provided in the central bottom portion of the runway adjacent the counting point.

The magnetic sensing unit 12 is indicated by a block positioned below and adjacent the runway 11, so that a can rolling along channel 11 passes in close proximity to one side of magnetic sensing unit 12. The magnetic sensing unit is coupled over conductors 13 and 14 to an amplifier unit 15, which is in turn coupled over conductors 16 and 17 to a control unit 18. Conductors 40 and 45 intercouple magnetic sensing unit 12 and energization means disposed within amplifier unit 15; if desired, the sensing unit can be energized from an independent unit. As will be made clear hereinafter, a variation of the effective magnetic circuit including the core of sensing unit 12 produces an output signal of increased level from the sensing unit as a can passes adjacent the top surface thereof, and this high level output signal is amplified in amplifier unit 15 and registered or tallied in the mechanism of control unit 18. The various elements and components of the system will now be described in connection with FIGURE 2.

As there shown, magnetic sensing unit 12 comprises a magnetic core 20, an input winding 21, and an output winding 22. The output winding is coupled over conductors 13 and 14 to a rectifier circuit 23, which includes a plurality of rectifier diodes 24—27 connected in a conventional bridge arrangement. A capacitor 28 is coupled across the output terminals of the rectifier circuit to smooth the output voltage waveform. The connection and operation of such circuits are well known and understood in the art.

One output terminal of rectifier circuit 23 is connected over a diode 30 to emitter 31e of transistor amplifier 31, which in the illustrated embodiment is of the PNP type. Those skilled in the art will recognize that an NPN type transistor can be utilized if desired, with the accompanying changes in connection of the unidirectional potential source to the transistor. It is, of course, well known that the transistor amplifier 31 is basically current controlled, as distinguished from the voltage control of vacuum tubes. Also, in the exemplary arrangement shown, this transistor amplifier 31 has the so-called common base or ground base circuit configuration which has the lowest input impedance of the various circuit configurations of transistors. This low input impedance enables the transistor amplifier 31 to have large or adequate response to relatively small signal variations in relatively small current flows fed to the transistor amplifier. The other output terminal of the rectifier bridge is connected over a conductor 32 to the positive terminal of a source of unidirectional operating potential, designated 29 which is also connected to base 31b of the transistor amplifier. Collector 31c of the transistor is coupled over winding 33 of a relay 34 to the negative terminal of the unidirectional potential source 29. Relay 34 also includes a pair of fixed contacts 35 and 36 and a movable contact 37. Fixed contact 35 and movable contact 37 are connected over conductors 16 and 17, respectively, to the input connections of a counter device 18 which includes a count display area 38. There are now commercially available a number of such counters which signify each engagement of movable contact 37 with fixed contact 35 and subsequent disengagement by advancing the count indicated in area 38 by one digit.

Fixed contact 35 and movable contact 37 are also connected over conductors 50 and 51, respectively, to the input terminals of a delay means 52. Such means can be any of a number of commercially available devices which produce an output operating signal or impulse after a control signal has been applied thereto for a pre-determined interval. With many such devices, the interval is readily adjustable so that an output impulse can be provided for any desired duration of the input control signal.

A relay 53 has an operating winding 54 coupled to the output terminals of delay means 52, and the armature of this relay is positioned to displace movable contact 55 from engagement with fixed contact 55' to a blank contact when the relay is energized. A feed motor 56 is provided, utilized to feed the cans along the can runway 11, and normally energized over a circuit which extends from supply voltage over conductor 59, feed motor 56, conductor 57, fixed contact 55', movable contact 55 and conductor 58 to supply voltage. Accordingly, responsive to engagement of contacts 35 and 37 of relay 34 for an interval sufficient to actuate delay means 52 and to operate relay 53, the energizing circuit for feed motor 56 is interrupted and the routing of cans along the can runway is terminated until the jam can be cleared.

Considering the energization of input winding 21 of magnetic sensing means 12, one end of winding 21 is coupled over conductor 40 and potentiometer 41, which includes a movable arm 42, to one end of secondary winding 43 of transformer 44. The other end of secondary winding 43 is coupled over conductor 45 to the other end of input winding 21. An A.-C. potential is applied to primary winding 46 of transformer 44 in conventional fashion, as by connecting this winding to a power distribution system. The energy flow from power transformer 44 to input winding 21 of sensing unit 12 can be regulated by adjusting the position of movable arm 42 on potentiometer 41, thereby establishing at a reference level the output signal induced in output winding 22 of the sensing unit.

Considering operation of the entire system, the primary winding 46 of transformer 44 is energized from an A.-C. power source, and a milliammeter is connected in the emitter circuit of transistor amplifier 31. Arm 42 on potentiometer 41 is then adjusted to provide an output signal of reference level in winding 22 of magnetic sensing unit 12; the reading on the milliammeter indicates whether the output signal, after amplification in transistor 31, will be below the level required to operate relay 34. A can is then placed on the runway over unit 12, and the milliammeter reading indicates, from the increased level of the signal in the emitter circuit, whether the increase in level of the amplified output signal will be sufficiently above the operating current level of relay 34 to ensure positive operation of the system. If the results of these tests are satisfactory, the milliammeter is removed from the transistor input circuit.

When a can or other magnetic object is displaced past the magnetic sensing unit, the amount of magnetic material in the magnetic circuit including core 20 is, in effect, increased. The output signal from winding 22 is thus increased; this output signal is rectified in bridge circuit 23 and applied to the transistor input circuit to effect an increased current flow in the collector circuit thereof, which in turn effects operation of relay 34 and engagement of contacts 35 and 37. This contact closure and subsequent reopening is registered by advancement of the count on counting unit 18 by one digit.

Whenever the material handling system becomes jammed and a plurality of cans pile up along the runway, one of the cans is positioned adjacent sensing unit 12 and an amplified control signal is continually passed from transistor 31 to winding 33 of relay 34. Accordingly, after contacts 35 and 37 of this relay have been engaged for a pre-determined time interval, delay means 52 is operative as described above, to provide an output impulse to winding 54 of relay 53, thus displacing movable contact 55 from engagement with fixed contact 54 and interrupting the energizing circuit for feed motor 56. Thus the feeding of cans into the runway is terminated, until the jam can be cleared and the material handling system again readied for operation.

In accordance with the invention, the magnetic sensing unit 12 can be constructed as shown in FIGURE 3. As there shown, the sensing unit or transformer comprises a central core 20 upon which the input winding 21 and output winding 22 are disposed. The core and windings are mounted within a shielding enclosure 48, which may be of aluminum. Enclosure 48 is U-shaped in section as shown to enclose all but the top portion of the sensing unit, and is suitably apertured to permit passage of conductors 13, 14, 40 and 45 into the unit for connection to the input and output windings therein.

In one embodiment of the invention, the open side of the sensing unit was placed at a distance of from 0.125 to 0.75 inch below the point over which the cans pass. In such embodiment, iron core 20 was made rectangular in shape, and input winding 21 was comprised of 450 turns of #24 plain enamel copper wire positioned to cover the lower half of the core. Output winding 22 was comprised of 238 turns of #20 plain enamel copper wire positioned to cover the upper half of iron core 20. With this physical configuration, and an A.-C. potential of about 3.7 volts supplied across input winding 21 of the magnetic sensing unit, a current of about 0.4 milliampere was produced in output winding 22. With passage of a magnetic object such as a can over the top side of the magnetic sensing unit to effectively increase the mass of the core, this current was increased from 0.4 to approximately 2 milliamperes. This fivefold increase in current was amplified in transistor amplifier 31, producing an amplified control signal more than ample to effect operation of relay 34 and provide a positive indication of the passsage of a magnetic object. The above values are given by way of illustration only, and are in no sense to be considered as limiting with respect to the features of the invention.

The illustrated and described construction of the magnetic sensing unit provides a very sensitive system which requires a minimum number of components. All of the components are static units, to provide a rugged yet compact system for realizing maximum life with a minimum of maintenance. The system is easily adjusted initially by movement of arm 42 on potentiometer 41 to obtain the desired signal level in output winding 22 of sensing unit 12, thus adjusting the level of the control signal applied to the input circuit of amplifier 31 for the given magnetic circuit. Such control signal is greatly increased when an object including some magnetic material passes adjacent the magnetic sensing unit to effectively add material to the magnetic circuit, and the output signal of increased level is passed through winding 33 of the relay to effect a contact closure which is registered by an associated counter and, if maintained for a pre-set interval, effects the operation of an associated delay means to halt the feeding of objects along the channel. Those skilled in the art will recognize that other means can be connected to the output of the transistor circuit, for example, a decade counting circuit in which the voltage impulses are totalled in the circuitry and indicated by the conduction of one or more of a group of neon lights to indicate the total number of cans passing a given point. With such a circuit the mechanical or moving parts can be entirely eliminated, leaving only magnetic and electrical circuit variations to effect indication of the passage of magnetic objects along the preassigned path.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. In sensing apparatus of the class described for sensing the rolling travel of cans comprised at least of some magnetic material down along a can runway, the combination of a magnetic sensing unit adapted for positioning below said runway, said sensing unit comprising a shielding enclosure having an open upper end, a magnetic core bar mounted within said shielding enclosure and having its upper end extending into the open upper end of said enclosure in laterally spaced relation thereto to define a magnetic air gap therebetween, an input winding on said core bar, an output winding on said core bar, a power supply transformer for supplying a relatively low voltage alternating current to said input winding, an alternating current supply circuit connecting said power supply transformer with said input winding, a potentiometer interposed in said alternating current supply circuit adapted to be set to establish a substantially predetermined reference level of the output voltage induced in said output winding, said magnetic sensing unit in its entirety including said shielding enclosure, core bar and input and output windings, all being disposed below said can runway with the cans traveling outside of and above both of said windings and with said magnetic core bar and the open end of said shielding enclosure facing upwardly in immediate proximity to the path of rolling travel of the cans, whereby the travel of said cans adjacent to said sensing unit varies the magnetic reluctance of said magnetic core bar and gap to create signal impulses in the alternating current output of said output winding, an amplifier unit spaced from said sensing unit, said amplifier unit comprising a rectifying bridge network formed of four legs having separate rectifying elements therein and provided with two diametrically opposite alternating current input terminals and two diametrically opposite direct current output terminals, a direct connecting circuit extending directly from the terminals of said output winding in said sensing unit to the two alternating current input terminals of said rectifying bridge network, a direct current signal circuit connecting with the two diametrically opposite direct current output terminals of said bridge network, a current responsive transistor amplifier having its input side connected to said signal circuit, said transistor amplifier responding fundamentally and being of common or grounded base circuit configuration having lowest input impedance for obtaining maximum response to relatively small changes in such input current flow, a direct current control circuit connected with the output side of said current responsive transistor amplifier to have amplified control impulses created in said control circuit, a control relay responsive to the control impulses created in said direct current control circuit, a feed motor for effecting the feed of cans along said runway, means responsive to the operation of said control relay for interrupting the operation of said feed motor if there is an abnormal occurrence in the travel of said cans along said runway, and delay means associated with said control relay for delaying the interruption of the operation of said feed motor until such abnormal occurrence has persisted for a predetermined time interval.

2. In sensing apparatus of the class described for sensing the rolling travel of cans comprised at least of some magnetic material down along a can runway, the combination of a magnetic sensing unit adapted for positioning adjacent to said runway, said sensing unit comprising a shielding enclosure having an open end, a magnetic core bar mounted within said shielding enclosure and having one end extending substantially into the open end of said enclosure, an input winding on said core bar, an output winding on said core bar, a power supply transformer for supplying a relatively low voltage alternating current to said input winding, an alternating current supply circuit connecting said power supply transformer with said input winding, a potentiometer interposed in said alternating current supply circuit adapted to be set to establish a substantially predetermined reference level of the output voltage induced in said output winding, said magnetic sensing unit in its entirety including said shielding enclosure, core bar and input and output windings, all being spaced to one side of the can runway with the cans traveling outside of both of said windings and with said magnetic core bar facing in immediate proximity to the path of rolling travel of the cans, whereby the travel of said cans adjacent to said sensing unit varies the magnetic reluctance of said magnetic core bar to create signal impulses in the alternating current output of said output winding, an amplifier unit spaced from said sensing unit, said amplifier unit comprising two alternating current input terminals, rectifying means in said amplifier unit connected with said two alternating current input terminals, a direct connecting circuit extending directly from the terminals of said output winding in said sensing unit to said two alternating current input terminals of said amplifier unit, a direct current signal circuit connecting with said rectifying means, a current responsive transistor amplifier having its input side connected to said signal circuit, said transistor amplifier responding primarily to changes in input current flow applied to its input side, a direct current control circuit connected with the output side of said current responsive transistor amplifier to have amplified control impulses generated in said control circuit, a control relay responsive to the control impulses generated in said direct current control circuit, a feed motor for effecting the feed of cans along said runway, and means responsive to the operation of said control relay for interrupting of the operator of said feed motor if there is an abnormal occurrence in the travel of said cans along said runway.

3. In sensing apparatus of the class described for sensing the rolling travel of cans comprised at least of some magnetic material down along a can runway, the combination of a magnetic sensing unit adapted for positioning adjacent to said runway, said sensing unit comprising a magnetic core structure, an input winding on said core structure, an output winding on said core structure, a power supply circuit for supplying a relatively low voltage alternating current to said input winding, said magnetic sensing unit in its entirety including said magnetic core structure and input and output windings all being spaced to one side of said can runway, but with said magnetic core structure facing in immediate proximity to the path of rolling travel of the cans, whereby the travel of said cans adjacent to said sensing unit varies the magnetic reluctance of said magnetic core structure to create signal impulses in the alternating current output of said output winding, an amplifier unit spaced from said sensing unit, said amplifier unit comprising rectifying means, a direct connecting circuit extending directly from the terminals of the output winding of said magnetic sensing unit to said rectifying means of the amplifier unit, a current responsive transistor amplifier having its input side connected to said rectifying means, said transistor amplifier responding primarily to changes in current flow applied to its input side, a control circuit connected with the output side of said current responsive transistor amplifier to have amplified control impulses generated in said control circuit, a control relay responsive to the control impulses created in said control circuit, and feed mechanism connected to respond to said control relay for controlling the travel of cans along said runway.

References Cited in the file of this patent

UNITED STATES PATENTS

| | | |
|---|---|---|
| 2,114,297 | Grover | Apr. 19, 1938 |
| 2,337,132 | Shaw | Dec. 21, 1943 |
| 2,492,182 | Robinson | Dec. 27, 1949 |
| 2,811,126 | Ford | Oct. 29, 1957 |
| 2,863,546 | Josefowiez | Dec. 9, 1958 |
| 2,917,732 | Chase et al. | Dec. 15, 1959 |
| 2,943,306 | Gray et al. | June 28, 1960 |
| 2,971,151 | Mierendorf et al. | Feb. 7, 1961 |
| 3,032,709 | Dudley | May 1, 1962 |